United States Patent [19]

Rittler

[11] Patent Number: 5,488,016
[45] Date of Patent: Jan. 30, 1996

[54] CELLULATED BODIES PRODUCED FROM PHOSPHOROUS POLYMERS

[75] Inventor: Hermann L. Rittler, Corning, N.Y.

[73] Assignee: Corning Incorporated, Corning, N.Y.

[21] Appl. No.: 355,071

[22] Filed: Dec. 13, 1994

Related U.S. Application Data

[60] Continuation of Ser. No. 86,515, Jul. 1, 1993, Pat. No. 5,403,519, which is a division of Ser. No. 630,544, Dec. 20, 1990, abandoned.

[51] Int. Cl.$^6$ .................................................. C03C 11/00
[52] U.S. Cl. ................. 501/39; 501/10; 501/47; 501/48; 501/52
[58] Field of Search .......................... 501/10, 47, 48, 501/39, 52

[56] References Cited

U.S. PATENT DOCUMENTS

| | | | |
|---|---|---|---|
| 2,434,281 | 1/1948 | Moulton | 501/48 |
| 3,223,537 | 12/1965 | Wiegert et al. | 106/40 |
| 3,261,696 | 7/1966 | Wiegert et al. | 106/40 |
| 3,372,110 | 3/1968 | Fuchs et al. | 210/57 |
| 3,382,082 | 5/1968 | Eubanks et al. | 106/40 |
| 3,519,445 | 7/1970 | MacDowell et al. | 501/47 X |
| 3,547,670 | 12/1978 | Fuchs et al. | 106/286 |
| 3,736,176 | 5/1973 | Francel et al. | 117/124 A |
| 3,762,935 | 10/1973 | Leach | 106/40 R |
| 4,127,415 | 11/1978 | Quackenbush et al. | 501/47 |
| 5,022,921 | 6/1991 | Aitken | 501/48 X |
| 5,051,246 | 9/1991 | Clark et al. | 423/305 |
| 5,196,381 | 3/1993 | Hu et al. | 501/47 X |
| 5,252,523 | 10/1993 | Beall et al. | 501/48 X |

FOREIGN PATENT DOCUMENTS 0839769  6/1960  United Kingdom ............... 501/39

*Primary Examiner*—Karl Group
*Attorney, Agent, or Firm*—Milton M. Peterson

[57] ABSTRACT

There is disclosed an amorphous, polymeric material that contains phosphorous, aluminum and carbon atoms, and that is the reaction product of a buffered liquid mixture of a source of phosphorous, such as 85% phosphoric acid, a source of aluminum, such as boehmite, and an organic liquid buffer, such as a carboxylic acid. The polymeric material may be converted to a glassy or crystalline solid by heating to a temperature of at least 150° C., and may be cellulated.

12 Claims, 2 Drawing Sheets

CELLULATED BODIES PRODUCED FROM PHOSPHOROUS POLYMERS

This application is a continuation application of Ser. No. 08/086,515, filed Jul. 1, 1993, now U.S. Pat. No. 5,403,519, which is a divisional of application Ser. No. 07/630,544, filed Dec. 20, 1990, now abandoned.

It is related to U.S. Pat. No. 5,281,399 issued Jan. 25, 1994. That patent is filed of even date herewith in my name and assigned to the same assignee as this application. The related application is concerned with an assembly wherein a refractory body having multiple gas passageways is positioned within a refractory container. The body is spaced from the container wall by a rigid cellular mass that may be produced from a polymeric material in accordance with the invention of this application.

FIELD OF THE INVENTION

The field of the invention is phosphorous-based polymeric materials and their production.

BACKGROUND OF THE INVENTION

Organic polymers are based on carbon atoms linked together in chains of varying length and structure. These materials are widely used, but their use is largely limited to low temperature applications. A great deal of effort has been expended in attempts to enhance their thermal resistance. However, these organic materials still tend to degrade, and ultimately be destroyed, at relatively low temperatures.

For higher temperature use, interest has centered in glasses and ceramics, or in inorganic polymers. Glasses and ceramics can be tailored to meet most high temperature applications. However, these materials require high melting, or sintering, temperatures, thus rendering them expensive to produce.

Known inorganic polymers are primarily based on silicon, and are referred to as silicones. These materials have been developed over the past half century, and are widely employed in intermediate temperature applications. They do not, however, provide the high temperature service available with glasses and ceramics.

The present invention provides a family of polymeric materials based on phosphorous. These polymers are basically inorganic in nature, but also have an associated organic group. They are of particular interest because they can be formed at room temperature, and then thermally converted to a glass or crystalline state. However, the conversion is at a temperature well below that normally required to melt a glass. Further, the phosphorous polymers may have additives that provide a wide range of glasses or crystalline phases.

SUMMARY OF THE INVENTION

My invention resides in an amorphous, polymeric material containing phosphorous, aluminum and carbon atoms. In the preferred method for making my inventive material, it is the reaction product of a buffered liquid system composed essentially of a source of phosphorous, a source of aluminum, and an organic liquid buffer. The system may further contain a variety of modifying additives, including both organic and inorganic materials. In one specific embodiment, nitrogen may be incorporated by adding a nitrogen containing material, such as urea. In another, halogens may be incorporated as halides. In other embodiments, a source of an oxide, such as silica, boric oxide, ceria, titania, zirconia, alkaline earth and alkali metal oxides, and transition metal oxides, may be incorporated in the system. The generally preferred source of phosphorous is 85% phosphoric acid. Also, relatively inert fillers and reinforcing media may be included.

The invention further resides in a method of producing an amorphous, inorganic polymeric material containing phosphorous, aluminum and carbon atoms, the preferred method comprising mixing a source of aluminum with a source of phosphorous oxide in an organic liquid buffered system. That method may further include heating the material to a temperature of at least 150° C. to produce a glassy or crystalline material.

PRIOR ART

In addition to the general knowledge of polymers already referred to, attention is directed to the following United States patents:

U.S. Pat. No. 3,547,670. (Fuchs et al.) describes hard, adhesive binders and coatings for metal, glass, ceramic, or refractory surfaces. The binders and coatings are produced from a mixture of one part by weight (pbw) superphosphoric acid (101 to 108% $H_3PO_4$) and 0.02 to 0.10 pbw glassy phosphate with alumina in an amount to provide an $Al_2O_3:P_2O_5$ mole ratio of about 2:3 to 3:1. The mixture is thermally cured on the surface involved, and may optionally contain silica and titania as additives. The glassy phosphate is a premelted sodium phosphate glass that may contain CaO and $Al_2O_3$. It is described as a critical ingredient to moderate the vigorous exothermic reaction.

U.S. Pat. No. 3,372,110 (Fuchs) describes the production of the glassy phosphate component used in the Fuchs et al. patent, above.

U.S. Pat. No. 3,736,176 (Francel et al.) describes coating a glass surface by spraying an aqueous solution on a hot glass surface and heat fusing the coating. The solution contains water, aluminum phosphate, phosphoric acid and a selected phosphate, oxide, carbonate, nitrate, or halide. There is no indication of a polymer mixture.

U.S. Pat. No. 3,223,537 (Wiegert et al.) discloses adding 22–27 parts of phosphoric acid to a mixture of 8–14 parts water; 25–31 parts granular alumina, 30–40 parts granular aluminum hydroxide and 0.01–0.1 parts aluminum powder to produce a foamed product.

U.S. Pat. No. 3,261,696 (Wiegert et al.) is a c-i-p that discloses adding alumina to a zirconia mixture. This mixture contains 76–80 parts zirconia, 7.5–10 parts alumina and 0.1–0.2 parts aluminum powder to which is added 3.1–5.0 parts water and 8–10 parts phosphoric acid to cause foaming.

U.S. Pat. No. 3,382,082 (Eubanks et al.) discloses producing a foamed-in-place body by pouring a slurry of a composition into a mold to foam and be cured at 65°–100° C. The composition includes 39–60 parts phosphoric acid, 10–55 parts aluminum hydroxide, 0.1–0.5 parts aluminum powder, 0.7–4.0 parts bentonite and sufficient aluminum phosphate to make up 100 parts in the mixture.

U.S. Pat. No. 3,762,935 (Leach) states that the foams disclosed in the Eubanks et al. patent are subject to collapse. To correct this, 1–20% of glass frit is added, and the foamed body is heated to a temperature in the range of 1000°–2000° C. This causes the glass to deposit on the cell walls of the foam and strengthen the walls.

DESCRIPTION OF THE INVENTION

Figure 1:
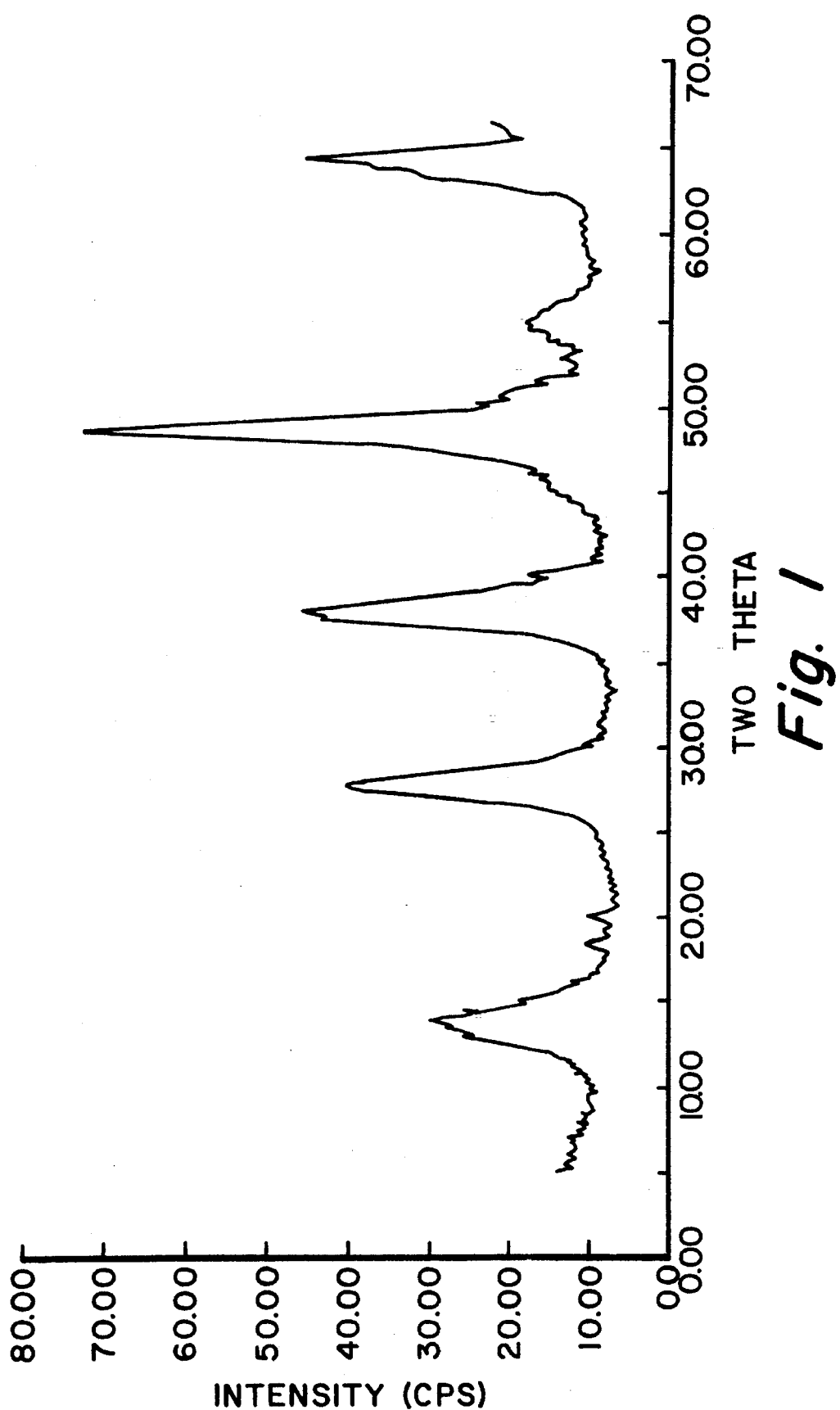
FIGS. 1 and 2 in the appended drawing are graphical illustrations of crystal structure, and lack thereof, respectively. The figures are based on x-ray diffraction (XRD) data and compare a crystalline mineral, boehmite, with an amorphous polymer produced therefrom in accordance with the invention.

The present invention is predicated on my discovery that phosphorous, in the form of an oxide or phosphate, can be combined with a source of aluminum and a source of carbon to form a stable, amorphous polymer.

The source of aluminum may be the oxide, although a hydrated, or hydroxide, form is preferred. The hydroxide may be one of the mineral forms, such as, bauxite, boehmite, diaspore, gibbsite, bayerite, or nordstrondite, Aluminum chlorohydrate, $Al_2(OH)3Cl.2.5H_2O$, is another preferred source. The aluminum source should be added last, with vigorous stirring, since the reaction is strongly exothermic and usually accompanied by a large increase in viscosity. In fact, when alumina is added to phosphoric acid in the absence of a buffer, the reaction proceeds so vigorously that the mixture almost immediately sets up to form a rigid mass. This precludes any mixing, casting, or other processing.

Any source of phosphorous may be employed. However, a phosphate is normally used. Commercial 85% phosphoric acid is preferred because of its ready availability. However, other phosphates, such as aqueous solutions of ammonium mono-, or di-, basic phosphate, or a metal phosphate, such as calcium phosphate, may be employed, providing the additional ions are desired, or may be tolerated. The ammonium phosphates may be desirable as a solvent where boric oxide is to be incorporated in the polymeric material.

An organic liquid buffer is a preferred source of carbon and may be any of the known and commercially available organic compounds. Thus, it may, for example, be selected from one or more of the following organic groups: alkanes, alkenes, alkynes, aromatics, alcohols, ethers, carbonyl compounds, carboxylic acids and esters, amines and amides, monomers and polymers.

Aliphatic acids, such as acetic and tartaric, are particularly effective. However, other organics, such as beta-alanine, ethylene glycol and EDTA may be employed, depending on the particular characteristics desired. For example, beta-alanine is also a good solvent for boric oxide.

By varying the stoichiometries of the starting materials, polymers may be produced having viscosities that range from very thin to semisolids that approach a brittle state at ambient temperature. In general, viscosity increases with the mole ratio of $A_2O_3$ to $P_2O_5$ which, for that reason, should not normally exceed about 1:1. Also, depending on the proportions, as well as the components used, particularly the organic, the polymers may be opaque, translucent, or transparent.

X-ray studies show these mixtures to be amorphous as made. Fourier-Transform Infra Red (FT-IR) analyses show that the materials have structures that are totally different from their precursor materials. The polymeric nature is also evidenced by the fact that viscosity continuously changes as a function of mixing time. That is, the viscosity increases as the mixing time increases.

The change effected by the method of the invention is illustrated in the appended drawing. The figures of the drawing show XRD curves. These are based on data obtained by scanning a material as it is rotated in an automated powder diffraction unit available from North American Philips Corp. and designated Model 3720. The scanning angle, in the customary units of Two Theta, is plotted along the horizontal axis, while intensity, in terms of counts/seconds (cps), is plotted along the vertical axis.

FIG. 1 represents data obtained from scanning a sample of the mineral boehmite (aluminum hydroxide) as received. The several intensity peaks are characteristic of the mineral. These peaks occur at values of 6.47, 6.38, 3.181, 2.353, 2.341, 1.857, 1.453 and 1.437.

Figure 2:
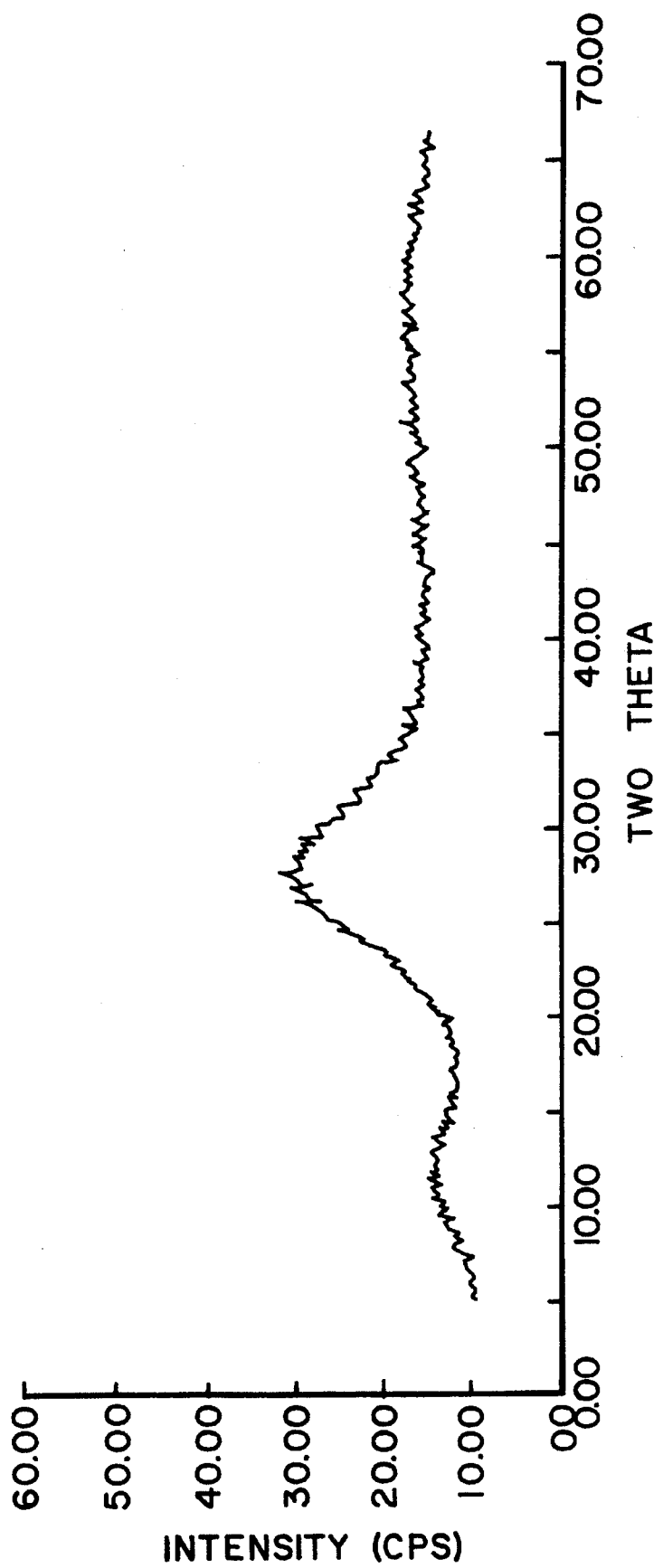

FIG. 2 represents data obtained from scanning a film of a viscous polymer sample dried on a microscope slide. The polymer is that obtained from Example 1, infra. Noteworthy is the essential flatness of, and lack of peaks in, the curve. This is typical of an amorphous material free of crystals, such as crystal-free glass or polymer.

Nitrogen may be introduced into the polymer by addition of organic nitrogen sources, such as urea or amines. This tends to stiffen, or render more viscous, the polymer. However, it may also provide a clear water white, transparent polymer that has excellent light transmission. This may find application as an intermediate between glass sheets in windows, doors, and the like. An application of considerable interest is fire doors, since the polymer also foams when heated.

It is also possible to incorporate halogens into the polymeric product. This may be accomplished by such additives as metal chlorides. However, a less stable additive, such as an ammonium halide or an organic halide may be more effective.

It is also contemplated that any of the known inert fillers and/or reinforcing media may be added. This is particularly important in a foamed product where added strength may be highly significant. Thus, such known reinforcing forms as whiskers, fibers, and plates may be employed. Materials ranging from glass fibers to silicon carbide whiskers are contemplated.

The polymeric materials of the invention may provide a host for known organic lasing dyes. These may be added during the formation of the material, or by subsequent addition if the viscosity is sufficient. Thus, a material containing a dye may possess interesting opto-electronic properties.

Most phosphate glass and crystalline stoichiometries may be formulated by combining a source of one or more suitable metal oxides in the polymeric mixture. In particular, such oxides as boric oxide, silica, ceria, titania, zirconia, the alkaline earth and alkali metal oxides and transition metal oxides may be incorporated. The alkali metal oxides, which tend to produce water-soluble glasses, should be employed with care to avoid such instability. Phyllosilicates, such as vermiculite, may also be added to the mixture.

To produce a glass and/or glass-ceramic material, the polymer mixture is heated to a temperature well below the normal melting temperature for such a composition. Depending on the precursor constituents of the polymeric material and the thermal treatment conditions employed, either a glass or crystalline body may be produced. In general, if the polymeric material has a composition that tends to crystallize, and is heated gradually, formation of a crystalline material is favored. Proper selection of the composition and/or very rapid heating, such as placing the material in a preheated furnace, tends to produce a glassy body.

In producing the polymeric mixture, the mole ratio of alumina to phosphate ($A_2O_3:P_2O_5$), should not exceed about 1:1. As indicated earlier, viscosity decreases as the excess of phosphoric acid increases.

It is also possible to produce a foamed body from the polymeric material of the invention. The basic, three-component system will produce a rigid aluminophosphate matrix for the cells of the foam. The matrix may be glassy or crystalline depending on the makeup of the precursor polymer, and the nature of the foaming process. In the case of a glassy matrix, the aluminophosphate may be modified by the presence of known glassmaking, or modifying, materials. In the case of a crystallized matrix, a second crystal phase, in addition to the aluminophosphate, may result from the presence of one or more oxides selected from: silica, boric oxide, ceria, titania, zirconia, the transition metal oxides and the alkali and alkaline earth metal oxides.

A foamed body may be produced by heating the amorphous polymeric product in a confined space to a relatively low temperature, and holding at that temperature to permit a desired degree of gas evolution. The temperature may be as low as 150° C., but this normally requires a long hold time with consequent loss of gas. Accordingly, a temperature of about 300° C., and a hold time of one hour, are usually preferred.

For example, the polymeric product of a buffered system, composed of one mole tartaric acid, two moles each of aluminum hydroxide and boric oxide, and four moles of 85% phosphoric acid, was heated to 300° C. and held for one hour. This resulted in a hard, foamed body which showed aluminophosphate and borophosphate crystal phases when examined by x-ray diffraction.

The foamed body may be heated to much higher temperatures, of course, with no structural change. However, in some cases, a change in crystal phase may occur.

Proper selection of the precursor materials for the polymeric product will permit producing a rigid body, either solid or foamed, that may be either transparent to, or absorptive of, microwave radiation.

In the former case, the material may be employed as a container or mold for a material to be heated by microwaves. In the latter case, where microwaves are absorbed, the material may be tailored to function as a susceptor. The presence of alkali metals favors absorption. Conversely, for good microwave transmission, such metals should be avoided.

Normally, a thermal treatment is carried out in air, the atmosphere not affecting the generation of a foamed or solid body. However, it is contemplated that the treatment may be in a static or flowing atmosphere of a reactive gas if a special effect is desired. Thus, an oxygen or hydrogen atmosphere may be employed if, respectively, an oxidized or reduced surface is desired. Other reactive atmospheres include ammonia, sulfides and the halogens. Conversely, an inert atmosphere, such as argon or helium, may be employed if possible reaction is to be avoided.

SPECIFIC EXAMPLES

The invention is further illustrated by reference to several specific, representative embodiments. In each example, the relative amounts of materials involved are presented in mole ratios, unless otherwise indicated.

Examples 1–6

Six formulations of acetic acid (HAC), aluminum hydroxide (A1OOH) and 85% phosphoric acid ($H_3PO_4$) were prepared by adding the A1OOH to a mixture of acetic and phosphoric acids. TABLE 1 shows the mole ratios of the three materials for the six formations. It also shows the nature of the product produced. In each case, a vigorous exothermic reaction took place, and the mixtures were continually stirred.

TABLE 1

|    | HAC | AlOOH | $H_3PO_4$ | Appearance |
|----|-----|-------|-----------|------------|
| 1. | 1   | 1     | 3         | transparent viscous |
| 2. | 1   | 2     | 3         | Very hard, white, opaque |
| 3. | 1   | 1     | 1         | Very hard, white, opaque |
| 4. | 1   | 2     | 4         | Very hard, white, opaque |
| 5. | 1   | 1     | 4         | Fluid transparent |
| 6. | 1   | 1     | 2         | Viscous, white, opaque |

It is apparent that the viscosity of the polymeric reaction product is dependent on the relative proportions of aluminum hydroxide and phosphoric acid in the parent mixture. Thus, an increase in the relative content of aluminum hydroxide increases the viscosity, while increasing the relative content of phosphoric acid decreases viscosity. It is my belief, based on FT-IR analyses of the polymerized product, that aluminum actually enters a polymeric structure. Whatever the phenomenon involved, the increase in viscosity, as well as changes in x-ray and FT-IR patterns, suggest development of a polymeric material containing both aluminum and phosphorous.

Example 7–24

In each of these examples, a three component mixture was produced in the manner described above for Examples 1–6. However, the liquid organic buffer was varied, as were the relative proportions of the mixture ingredients. The polymeric products obtained varied in viscosity in the same manner as noted for Examples 1–6.

In each case, the polymeric reaction product was subsequently heated at a rate of about 300° C./hour to a predetermined temperature, held at that temperature for one hour, and cooled. The atmosphere maintained over the material during the heat treatment was either air or ammonia gas. The fired product in each case was a foam material that was analyzed for crystal phases by x-ray diffraction (XRD) techniques.

TABLE 2, below, shows, for each example, the organic buffer used; the ratio, in moles, of organic: $A1OOH:H_3PO_4$; the hold temperature in °C. and time in hours; the atmosphere; and the crystal phase(s) observed by X-ray.

The organic buffers utilized included tartaric, oxalic, citric, acrylic and formic acids, as well as ethylene glycol, urea, β-alanine and EDTA.

TABLE 2

| No. | Organic | Ratio | Temp./Time | Atmos. | Crystal |
|-----|---------|-------|------------|--------|---------|
| 7.  | β-Alanine | 1:1:3 | 300/1 | $NH_3$ | $NH_4AlP_2O_7$ $Al(PO_3)_3$ |
| 8.  | β-Alanine | 1:1:3 | 900/1 | Air | $Al(PO_3)_3$ $AlPO_4$ |
| 9.  | Tartaric | 1:1:3 | 300/1 | Air | $AlH_2P_3O_{10}xH_2O$ |
| 10. | Tartaric | 1:1:2 | 300/1 | Air | $AlPO_4$ |
| 11. | Tartaric | 1:1:2 | 300/1 | $NH_3$ | $AlPO_4$ |
| 12. | Oxalic | 1:1:2 | 300/1 | $NH_3$ | $NH_4AlP_2O_7$ $AlPO_4$ |
| 13. | Oxalic | 1:1:2 | 600/1 | $NH_3$ | $(NH_4)_6(PO_3)_6H_2O$ |

TABLE 2-continued

| No. | Organic | Ratio | Temp./Time | Atmos. | Crystal |
|---|---|---|---|---|---|
| 14. | Formic | 1:1:2 | 300/1 | $NH_3$ | $Al(PO_3)_3$ $AlPO_4$ $NH_4AlP_2O_7$ |
| 15. | Formic | 1:1:2 | 600/1 | $NH_3$ | $Al(PO_3)_3$ $H_2AlP_3O_{10}$ |
| 16. | Formic | 1:1:2 | 300/1 | Air | $AlH_2P_3O_{10}xH_2O$ |
| 17. | Formic | 1:1:3 | 300/1 | Air | $AlH_2P_3O_{10}xH_2O$ |
| 18. | EDTA | 1:0.5:3.5 | 300/16 | Air | $Al(PO_3)_3$ |
| 19. | Citric | 1:1:3 | 300/1 | Air | $AlH_2P_3O_{10}xH_2O$ |
| 20. | Ethylene Glycol | 1:1:1 | 300/1 | Air | $AlPO_4$ |
| 21. | Ethylene Glycol | 1:1:1 | 600/1 | Air | $AlPO_4$ |
| 22. | Ethylene Glycol | 1:1:1 | 900/1 | Air | $AlPO_4$ |
| 23. | Urea | 1:1:2.4 | 300/1 | $NH_3$ | Glass |
| 24. | Acrylic | 1:1:3 | 300/1 | Air | $AlH_2P_3O_{10}xH_2O$ |

Example 25

Sixty (60) grams of acetic acid were mixed with 236 grams of 85% phosphoric acid. Thirty (30) grams of boehmite (A100H) were added with stirring, together with 50 grams of talc. The reaction product was heated to 300° C. in air and held at that temperature one hour. This produced an eggshell-like foam that bonded to a glass surface. XRD analysis showed a crystal phase corresponding to $Al_3(PO_4)_2(OH)_3.5H_2O$. Further heating to 600° C. produced an amorphous transparent soft foam. Heating to 900° C. for one hour produced a glassy foam that bonded to cordierite and that remained a glassy foam when exposed to water at 95° C. for one hour.

Example 26

Sixty (60) grams of acetic acid were mixed with 354 grams of 85% phosphoric acid and 100 grams of calcium acetate. Sixty grams of boehmite were added slowly with constant stirring. When the mixture was heated to 300° C. and held for an hour, a firm grey foam resulted that showed an $AlPO_4$ crystal phase. Heating to 600° C. produced a crystalline grey foam, while heating to 900° C. produced a hard white foam showing $AlPO_4$ and $Al(PO_3)_3$ phases.

Example 27

Sixty (60) grams of acetic acid were mixed with 354 grams of 85% phosphoric acid, sixty (60) grams of magnesium acetate and sixty (60) grams of urea. To this mixture were added sixty (60) grams of boehmite with constant stirring. Heating for an hour at 300° C. in air produced a firm tan foam. This foam was amorphous with a trace of $AlPO_4$ crystals, and floated when placed on water at 95° C. Further heating at 600° C. changed the foam color to grey. At 900° C. the color became white, and hexagonal aluminum and magnesium phosphate crystal phases were observed.

Example 28

Sixty (60) grams of acetic acid were mixed with 354 grams of 85% $H_3PO_4$ and 120 grams of urea. To the mixture, 120 grams of boehmite were added with constant stirring. Heating for an hour at 300° C. produced a firm tan foam which remained visually unchanged when heated an hour at 600° C. Heating to 900° C. changed the foam to a hard, off-white material that showed a cubic aluminum phosphate phase. The foam floated when placed on water at 95° C.

Examples 29–32

Fifty (50) grams of calcium acid phosphate ($Ca(H_2PO_4)_2.H_2O$) were dissolved in 50 ml of nitric acid $HNO_3$). Forty (40) ml. of 2M tartaric acid and twelve (12) grams of $B(OH)_3$ were added to the solution, after which twelve (12) grams of $Al(OH)_3$ were added with stirring. When the reaction subsided, a viscous gel remained.

The gel was then subjected to four (4) separate heat treatments in air. The product of each heat treatment was analyzed by powder XRD. The TABLE that follows shows the heat treatments in terms of heating rate and hold time, and the nature of the product.

TABLE

| Heat Treatment | Product |
|---|---|
| 1. Dried at 110° C. | Amorphous |
| 2. 300°/hr. to 600° C. Hold one hour | Hard, white foam, Slight crystallization |
| 3. 300° C./hr to 1000° C. Hold one hour | Hard white foam with $Ca_2P_2O_7$ and $CaO.P_2O_5.B_2O_3$ Crystal phases. |
| 4. 300° C./hr to 1200° C. Hold one hour | Hard white foam with $Ca_2P_2O_7$ Crystal phase. |

Example 33

A buffered mixture was prepared by mixing tartaric acid, boehmite powder (aluminum hydroxide), anhydrous boric acid $B(OH)_3$ and 85% phosphoric acid in a mole relation of 1:2:2:4, respectively. The mixture was continually stirred with the boehmite added last. When the reaction subsided, a viscous liquid remained. This was placed in an oven at 300° C. and held for one hour. The foamed body thus produced was about three times the height of the precursor gel. It had a bulk density of about 0.3 grams/$cm^3$ and a coefficient of thermal expansion (25°–600° C.) of about $69 \times 10^{-7}$/°C.

Example 34–45

Numerous experiments were carried out to illustrate the variety of materials that might be included in the phosphorous polymer, buffered liquid system as additives. Also, the effect of such additions on the bulk density of foams produced from the polymer was measured. The 1:2:2:4 buffered mixture, used and described in the previous example, was employed as a base formulation. A further fifth component was included in this formulation for each experiment. The amount was a percentage by weight of the base.

In each case, the resulting polymeric material was heated to 600° C., held at that temperature for one hour in air and cooled. TABLE, below, lists, in weight percent, some of the additives employed; also, the bulk density, in grams/cubic centimeter (g/$cm^3$), of the foam produced, and the appearance of the foam.

TABLE

| Additive | Bulk Density | Appearance |
|---|---|---|
| 34. 5% $CaCl_2$ | 0.273 | Hard, Black |
| 35. 10% $CaCl_2$ | 0.255 | Hard, Black |
| 36. 20% $CaCl_2$ | 0.548 | Hard, Grey |
| 37. 10% $Ca(H_2PO_4).H_2O$ | 0.244 | Glassy inclusion |
| 38. 10% $NH_4BF_4$ | 0.213 | Hard, Grey |

TABLE-continued

| Additive | Bulk Density | Appearance |
|---|---|---|
| 39. 10% $NaMoO_4.2H_2O$ | 0.349 | Hard, Bluish, White |
| 40. 10% $NaWO_4.2H_2O$ | 0.51 | Hard, Eggshell |
| 41. 10% $Zn_3(PO_4)_2.2H_2O$ | 0.212 | Hard, Grey |
| 42. 10% $BaCl_2.2H_2O$ | 0.44 | Glassy surface |
| 43. 10% Bone Ash | 0.28 | Coarse, Grey Slightly glassy. |
| 44. 10% $BaHPO_4$ | 0.43 | Coarse, Dull Black |
| 45. 10% $AlF_3$ | 0.32 | Hard |

In general, the space occupied by the mixture before foaming increased by about three to five times during foaming. This indicated a decrease in density to about 35 to 20% of the original polymeric material.

Example 46–52

Examples 1 and 5 illustrate formulations that provide a transparent polymerized product. Several other formulations have provided transparent, or translucent gels. These gels have remained stable over several months' exposure to ambient conditions. Particularly effective are gels produced with urea or ethylene glycol as the organic buffer.

The following TABLE shows several formulations, in terms of mole ratios of phosphoric acid:organic:aluminum hydroxide, that produced transparent or translucent gels. The TABLE lists mole ratio and the organic in each example.

TABLE

| | Mole ratio | Organic | Appearance |
|---|---|---|---|
| 46. | 1:1:1 | Urea | Transparent |
| 47. | 3:1:1 | Ethylene glycol | Transparent |
| 48. | 1:1:1 | Ethylene glycol | Transparent |
| 49. | 3:1:1 | Beta-alanine | Transparent |
| 50. | 2:1:1:1 | Tartaric acid + boric acid | Transparent |
| 51. | 1:1:1:1 | Tartaric acid + 40% $SiO_2$ sol | Translucent |
| 52. | 1:1:1:1 | Oxalic acid + 40% $SiO_2$ sol | Translucent Translucent |

Examples 53–56

Four (4) comparison mixtures were prepared to demonstrate how organic additions modify the reactions and working properties of alumina-phosphate mixtures. In each mixture, the components were mixed in equal mole ratios, that is 1:1 or 1:1:1.

In one mixture, powdered boehmite (A100H) was added to phosphoric acid. The reaction was very vigorous with a strong exothermic output, and the mixture set up to a stiff body immediately. This prevented any stirring, casting, shaping, or other working of the reaction product.

The procedure was repeated, except that the phosphoric acid ingredient was commercial 85% phosphoric acid from which water had been removed to produce 100% acid. The reaction, and product produced, were essentially the same as with the 85% acid.

Again, the procedure was repeated. This time, the powdered boehmite was added to a buffered system composed of equal molar parts of 85% phosphoric acid and glacial acetic acid. The reaction was still exothermic, but much less vigorous. This provided a gel-like material that could be stirred, and from which fibers could be drawn and shapes molded. However, the viscosity continuously increased as the reaction proceeded with stirring, eventually resulting in a hard, white, opaque material.

The foregoing procedure was repeated, except that the 100% phosphoric acid was substituted for the 85% acid. The resulting reaction, and property characteristics of the product, were essentially the same. However, the reaction proceeded at a slightly slower rate.

The conclusions to be drawn were two-fold. First, organic liquid buffer additions were necessary to slow down the reaction and provide useful working properties, as well as optimum physical-chemical properties. Second, the continuing increase of viscosity as the reaction progressed in the buffered systems, and the grey (off-white) color obtained when the material was heated to 600° C., made it apparent that polymerization was occurring.

I claim:

1. A rigid glass or crystalline body that consists essentially of oxides of phosphorous and aluminum, that is thermally vitrified or crystallized from an amorphous, precursor, polymeric material consisting essentially of aluminum, phosphorous and carbon atoms and wherein the body is a cellulated body and has a bulk density no greater than one half that of the precursor polymeric material.

2. A rigid body in accordance with claim 1 wherein the cellulated body has a crystalline matrix containing an aluminophosphate crystal phase.

3. A rigid body in accordance with claim 1 wherein the amorphous, precursor polymeric material is the reaction product of a buffered liquid system composed essentially of a source of phosphorous, a source of aluminum and an organic liquid buffer.

4. A rigid body in accordance with claim 3 wherein the source of phosphorous and the source of aluminum are present in a molar ratio of at least 1:1.

5. A rigid body in accordance with claim 1 wherein the amorphous, precursor, polymeric material further includes a source of nitrogen to provide a nitrogen atom for the polymer.

6. A rigid body in accordance with claim 1 wherein the body is modified by an additive included in the polymeric material.

7. A rigid body in accordance with claim 6 wherein the additive is at least one oxide selected from the group consisting of silica, boric oxide, titania, ceria, zirconia, alkali and alkaline earth metal oxides and transition metal oxides.

8. A rigid body in accordance with claim 7 wherein the selected oxide is boric oxide.

9. A rigid body in accordance with claim 1 wherein the bulk density of the rigid glass or crystalline body is in the range of 10–50% of that of the precursor polymeric material.

10. A rigid body in accordance with claim 6 wherein the additive included in the polymeric material is a source of a halogen.

11. A rigid body in accordance with claim 6 wherein the additive included in the polymeric material is a reinforcing medium in the form of whiskers, fibers, or plates.

12. A rigid body in accordance with claim 1 wherein the cellulated body has a bulk density of approximately 0.21–0.55 gms/cm$^3$.

* * * * *